United States Patent [19]

Yamazaki et al.

[11] Patent Number: 4,927,493
[45] Date of Patent: May 22, 1990

[54] METHOD FOR MANUFACTURING LIQUID CRYSTAL DEVICE HAVING ELECTRODE STRIPS OF NO USE

[75] Inventors: Shunpei Yamazaki, Tokyo; Akira Mase, Atsugi; Hiroyuki Sakayori, Machida, all of Japan

[73] Assignee: Semiconductor Energy Laboratory Co., Ltd., Atsugi, Japan

[21] Appl. No.: 222,635

[22] Filed: Jul. 21, 1988

Related U.S. Application Data

[63] Continuation of Ser. No. 82,544, Aug. 7, 1987, Pat. No. 4,854,675.

[30] Foreign Application Priority Data

Aug. 7, 1987 [JP] Japan .................. 61-186201

[51] Int. Cl.⁵ .................. B44C 1/22; B23K 26/00
[52] U.S. Cl. .................. 156/643; 156/153; 156/154; 156/272.8; 156/292; 219/121.69; 350/336; 350/343; 428/1

[58] Field of Search ........... 156/153, 154, 643, 272.8, 156/292; 219/121.68, 121.69, 121.78; 428/1; 350/336, 343

[56] References Cited

U.S. PATENT DOCUMENTS

4,671,848  6/1987  Miller et al. .................. 156/643
4,724,219  2/1988  Ridinger .................. 156/643 X Primary Examiner—Robert A. Dawson
Attorney, Agent, or Firm—Sixbey, Friedman, Leedom & Ferguson

[57] ABSTRACT

An improved liquid crystal device for display is disclosed. The device is comprised of a pair of substrates on whose insides a number of electrode strips are formed in a matrix. The electrode strips are formed also near the periphery portions of the substrates which are unnecessary for the pixels of the display. By virtue of the excess electrode strips, joining the substrates can be done without special attention to the coincidence of the substrates.

6 Claims, 3 Drawing Sheets (A)

(B)

(C)

(D)

(E)

METHOD FOR MANUFACTURING LIQUID CRYSTAL DEVICE HAVING ELECTRODE STRIPS OF NO USE

This is a continuation of application Ser. No. 082,544, filed Aug. 7, 1987, now U.S. Pat. No. 4,854,675.

BACKGROUND OF THE INVENTION

This invention relates to a liquid crystal device and a method for same.

Liquid crystal devices have been utilized for microcomputers, wordprocessors, television sets and so forth, as displays thereof. Such a display comprises a pair of substrates with a liquid crystal layer inbetween, and electrode arrangement to apply an electric field to the liquid crystal layer. The electrode arrangement is divided into a plurality of sections by which pixels of the display are formed. With a suitable voltage applied to a particular section of the electrode, a corresponding portion of the liquid crystal layer is subjected to electric field. Namely, in correspondence with the direction of the electric field or whether or not the voltage is applied, the liquid crystal changes its optical characteristics and then images or characters are displayed.

The electrode arrangement is for example comprised of a plurality of first electrode strips arranged in a X direction on the inside of one substrate, and a plurality of second electrode strips arranged in a Y direction on the opposed inside of the other substrate. The strips are formed by lithography with masks (photoresist). Even if the pattern of the electrodes is comparatively simple, the photoetching has to be carried out with special accuracy. Because of this the lithography process requires many steps and eventually the price of the liquid crystal display rises.

To cope with the conventional shortcomings, the applicant has proposed an improved process in which a laser beam having a linear cross section is radiated to a transparent conductive film prepared on a substrate surface other than the periphery, and then the irradiated linear portion of the film is removed by vaporization, so that the remaining conductive film forms electrodes or leads. With this process, dispensed with are a coating step, a prebaking step, an exposure step, a developing step, a postbaking step, an etching step and a step of removing the coated photoresist.

Anyway, it is required in accordance with prior art to mate a pair of substrates and to form electrode pads with high special accuracy, while preparing a connection area for an external flexible connector of a PCB (print circuit board). For this reason, a spacial margin must be provided adjacent to a sealing resin layer of a panel, as designated by 9 in FIG. 1.

FIG. 1 is a cross section view showing a prior art configuration of a liquid crystal display. The liquid crystal device is provided with a plurality of first electrode strips 2' elongated in the direction perpendicular to the drawing sheet, and a plurality of second electrode 2 strips elongated in the lateral direction, with a liquid crystal layer 5 disposed between a pair of substrates 1 and 1'. Between the electrode arrangement 2 and 2' and a sealing member 6, a margin 9 is designed so that the sealing member 6 shall not extend on the electrode strips 2 and 2'. If the member 6 partially hides the electrode strips, liquid crystal is pushed away from a corresponding portion of the panel and therefore the corresponding displaying portion can not work. The width of the margin is, e.g., 3 to 5 mm. The margin, however, has no function in the finished product. Rather the size of the display is made large by this margin in comparison with the net displaying area of the liquid crystal panel.

Further, in such a flexible electrode circuit, the electrode strips are arranged only with distances of about several hundred micrometers, and thereby the substrates have to be mated with high skill and particular care. This makes the product expensive also due to decreased yield of the product.

SUMMARY OF THE INVENTION

It is therefore an object of the invention to provide a liquid crystal device having a large effective area.

It is another object of the invention to provide a compact liquid crystal device.

It is a further object of the invention to provide a liquid crystal device which can be easily manufactured.

DETAILED DESCRIPTION OF THE PREFERRED EMBODIMENT

Figure 1:
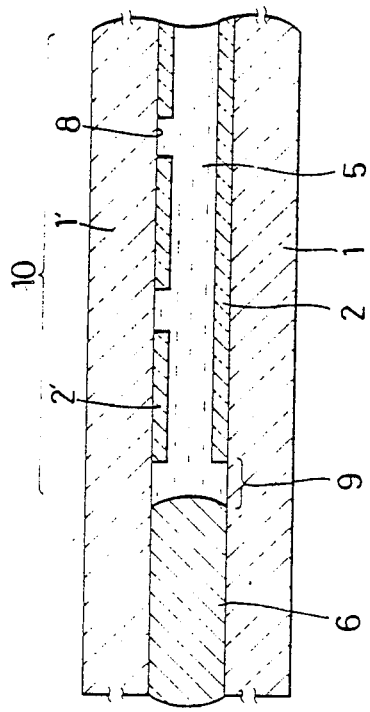
FIG. 1 is a cross section view showing a prior art liquid crystal device.
Figure 2:
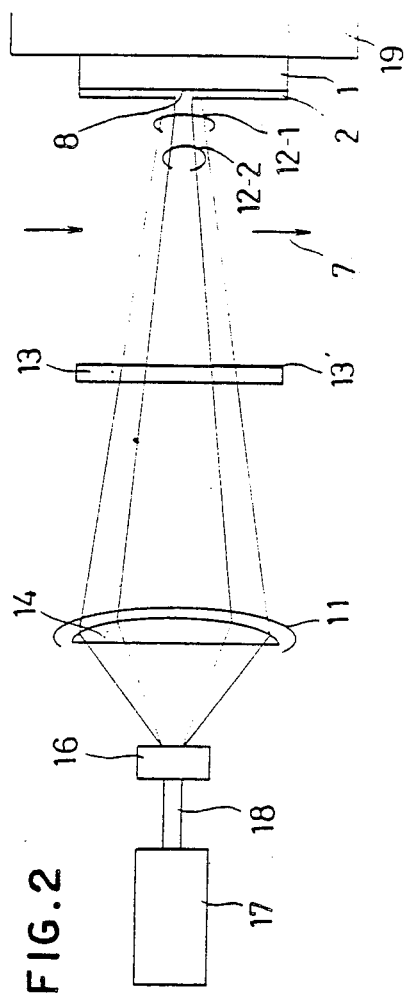
FIG. 2 is a block diagram showing a manufacturing process of a liquid crystal device in accordance with the present invention.

Referring to FIG. 2, patterning of an electric arrangement in accordance with the present invention is explained. A substrate, e.g., a glass substrate, with a transparent conductive film, e.g., made of $SnO_2$ (Eg.=3.5 eV) to be processed is mounted on a base 19. Opposing to the substrate 1, an optical system is arranged approximately on a line normal to the surface of the substrate to be processed. The substrate is irradiated with a laser beam with 248 nm in wavelength and with 5.0 eV in photon energy, which is emitted from an eximer laser 17 using KrF (distributed from Questec Inc.), expanded by an expander 16 in one direction, contracted through a convex cylindrical lense 14 made of artificial quartz, and shaped through a mask 13. The laser beam has a rectangular cross section generally when emitted from an eximer laser. Assuming the efficiency to be 3%, the energy of the laser beam from the laser 17 is 350 mJ/sec. The mask is made of a quartz pane whose rear surface is partially provided with shading material to form a silt through which the laser beam can be shaped. The shading material is preferably a heat resistant material such as chromium, $MoSi_2$ or the like. The laser beam is first generated with a section area of 16 nm×300 nm, next expanded to 16 mm×300 mm on the convex lens 14. The power density of the laser beam on the convex lens 14 is $7.3 \times 10^{-2} mJ/mm^2$. Because the optical energy gap is 5.0 eV, the transparent film can sufficiently absorb the photon energy and be selectively removed.

The laser beam passing through the convex lens is contracting at such a proportion that, if it were not for the mask 13, the shorter side length of the rectangular cross section would be 100 microns on the substrate 1. With the mask 13, the laser beam is shaped to have a rectangular cross section 30 cm long 20 micron wide. The laser beam is radiated intermittently with the pulse width of 20 nanoseconds at 1 to 100 Hz, e.g., 10 Hz. Once treated with the pulsed beam, the transparent film is made chalky white and formed into fine powder. The irradiated portion of the film is removed by ultrasonic cleaning (the frequency is 29 KHz) for 1 to 10 minutes in water solution of acetone. According to experimental, no damage was observed on the underlying substrate.

Figure 3:
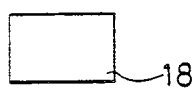
FIGS. 3(A) to 3(E) are explanatory diagrams showing cross sections of laser beams.
Figure 3:
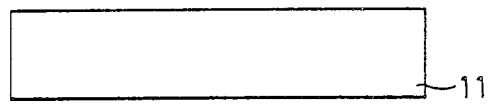
Figure 3:
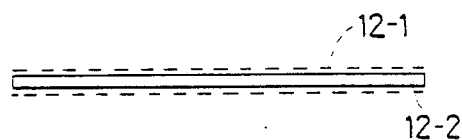
Figure 3:
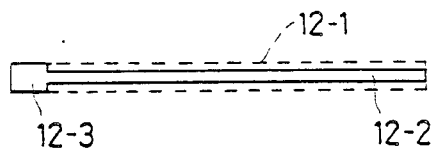
Figure 3:
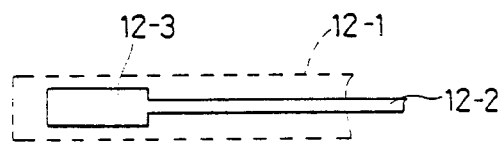

Referring to FIGS. 3(A) to 3(E), the shaping of the laser beam is explained. Laser beam emitted from the laser having a rectangular cross section as shown in FIG. 3(A) is expanded in a lateral direction as shown in FIG. (B). The periphery 12-1 of the expanded laser beam is removed with the mask 13 to obtain a desired cross section 12-2 according to which the conductive film is patterned, as shown in FIG. 3(C). The width of the laser beam 12-1 on the mask 13 prior to the removal is 100 microns. The width of the laser beam 12-2 passing through the mask 13 is 20 microns. The periphery of the laser beam can leave without being removed at at least one end as shown in FIG. 3(D). In this case, there can exist no mask at the position corresponding to the end. Similar configuration of laser beam can be obtained also by removing the complete perimeter of the expanded laser beam as shown in FIG. 3(E). FIG. 3(E) is drawn as an expanded view in comparison with FIGS. 3(C) and 3(D).

Figure 4:
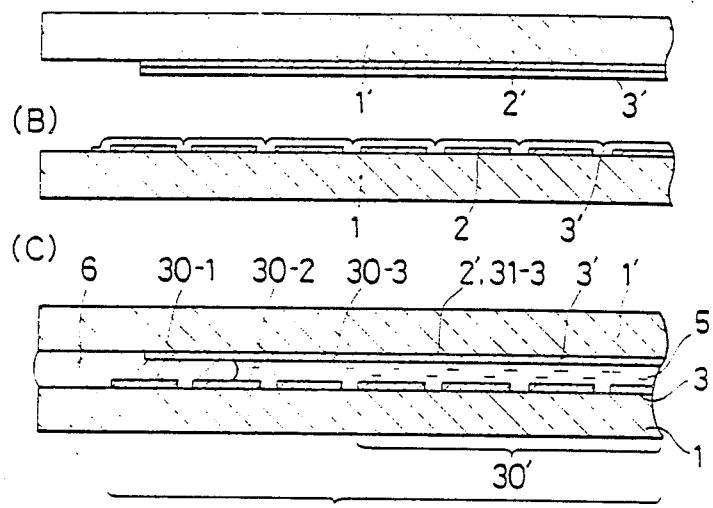
FIGS. 4(A) to 4(D) are partial views showing a liquid crystal display in accordance with the present invention.
Figure 4:
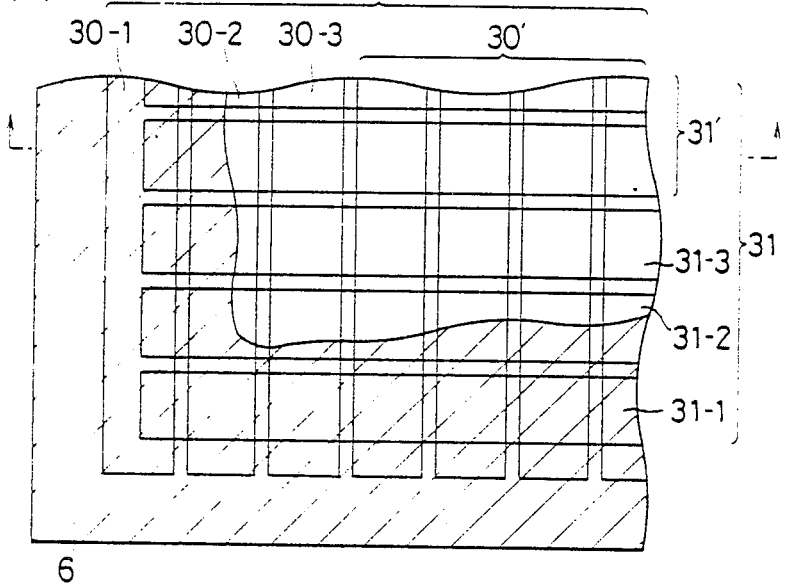

Referring to FIGS. 4(A) to 4(D), a liquid crystal device is illustrated. In the figure, the liquid crystal device for display comprises a pair of glass substrates 1 and 1', a plurality of first electrode strips 2' which are elongated along a X direction and separated from each other, a plurality of second electrode strips 2 which are elongated along a Y direction and separated from each other, oriented films 3 and 3' provided on the inside surfaces of the substrates, a liquid crystal layer 5, and sealing member 6 made of an organic resin. The electrode strips 2 and 2' are formed on the substrates 1 and 1' respectively as shown in FIG. 4(A) and 4(B) by repeatedly making use of the pulsed laser as explained in conjunction with FIGS. 3(A) to 3(E). The substrates 1 and 1' are joined in a manner that the sealing member covers the periphery part of the electrode arrangement 2 and 2' as shown in FIG. 4(C). In this figure, the second electrode strip 30-3 and the first electrode strip 31-3 can be marginal, so that the effective electrode strips are as designated with 30' and 31'. Because of inaccurate connection of the electrode strips with a peripheral circuit, the first electrode strip 31-3 and the second electrode strip 30-3 are not used. However, the number of such useless electrode strips may be increased or may not be provided. Anyway, in accordance with this invention, it is not necessary to join substrates in exact coincidence. Because of this, the display can be manufactured at a low price by a facilitated process.

While the present invention is described in conjunction with a preferred embodiment, the invention should not be limited to the particular example but only to the appended claims. Many modifications and variations may occur to those skilled in the art. Although the embodiment is provided with a pair of transparent substrates, one set of the first and second electrode strips may be reflective by making use of a metal to prepare reflective surfaces on which incident light reflects, while the other strips are transparent. In that case, the liquid crystal display requires only one polarizing plate, and therefore the device can be cheaper. Further, color filters can be provided for the liquid device to make it a color display.

What is claimed is:

1. A method of manufacturing a liquid crystal device comprising the steps of:
    coating a first substrate with a conductive film;
    scribing said conductive film with an eximer laser to form on the surface of said first substrate a plurality of first electrode strips elongated along an X direction;
    coating a second substrate with a conductive film;
    scribing the conductive film on the second substrate with an eximer laser to form a plurality of second electrode strips elongated along a Y direction; and
    joining said first and second substrates with the first and second electrode strips facing each other with a liquid crystal layer in between where the perimeter of the substrates is sealed.

2. A method of 1 wherein said laser scribing is implemented by said eximer laser and a mask for the laser beam.

3. A method of claim 2 wherein said laser scribing is implemented further by an expander for expanding said laser beam emitted from said laser.

4. A method of claim 3 wherein said laser scribing is implemented further by a cylindrical lens for contracting said laser beam expanded by said expander.

5. A method as in claim 1 where said laser scribing for each of the conductive films of the first and second substrates is so effected that there is a change in dimension of the strips along the length thereof so that the width of each electrode strip is more narrow at at least one end thereof relative to an intermediate portion of the electrode strip.

6. A method as in claim 5 wherein said eximer laser scribing for each of the conductive films of the first and second substrates is implemented by providing a laser beam elongated in the direction of said electrode strips and passing said beam through an opening in a mask where the opening is elongated in the elongated direction of the beam and includes two end portions and an intermediate portion between the end portions and where the width of at least one end portion of the mask opening in a direction substantially perpendicular to the elongated direction of the opening is greater than the width of the central portion of the opening.

* * * * *